(12) United States Patent
Ma

(10) Patent No.: US 12,376,561 B2
(45) Date of Patent: Aug. 5, 2025

(54) PET FEEDING-TRAINING DEVICE

(71) Applicant: Weimin Ma, Shenzhen (CN)

(72) Inventor: Hanyu Ma, Shenzhen (CN)

(73) Assignee: Weimin Ma, Shenzhen (CN)

( * ) Notice: Subject to any disclaimer, the term of this patent is extended or adjusted under 35 U.S.C. 154(b) by 138 days.

(21) Appl. No.: 18/104,411

(22) Filed: Feb. 1, 2023

(65) Prior Publication Data
US 2024/0166424 A1 May 23, 2024

(30) Foreign Application Priority Data

Nov. 22, 2022 (CN) .......................... 202223123346X

(51) Int. Cl.
A01K 5/01 (2006.01)

(52) U.S. Cl.
CPC ................................. A01K 5/0114 (2013.01)

(58) Field of Classification Search
CPC ................................ A01K 5/0114; A01K 5/01
See application file for complete search history.

(56) References Cited

U.S. PATENT DOCUMENTS

| 973,297 | A | * | 10/1910 | Poeppel | B65G 47/1478 |
| | | | | | 221/254 |
| 2,134,180 | A | * | 10/1938 | Felber | B65D 83/0409 |
| | | | | | 221/266 |
| 4,569,463 | A | * | 2/1986 | Pellegrino | A47G 19/34 |
| | | | | | 222/434 |
| 4,770,125 | A | * | 9/1988 | Gold | A01K 5/0233 |
| | | | | | 222/339 |
| 5,636,592 | A | * | 6/1997 | Wechsler | A01K 7/06 |
| | | | | | 119/53 |
| 6,267,639 | B1 | * | 7/2001 | Menow | B65D 83/0409 |
| | | | | | 221/152 |
| 6,681,954 | B2 | * | 1/2004 | Coleman | B65G 47/1407 |
| | | | | | 221/179 |
| 6,918,509 | B2 | * | 7/2005 | Baker | A47F 1/10 |
| | | | | | 221/266 |
| 10,896,750 | B2 | * | 1/2021 | Arric | A61J 7/0454 |
| 11,375,688 | B1 | * | 7/2022 | Wechsler | A01K 5/0107 |
| 2005/0263082 | A1 | * | 12/2005 | Rutledge | A01K 5/0275 |
| | | | | | 119/51.01 |

(Continued)

FOREIGN PATENT DOCUMENTS

KR 102115456 B1 * 5/2020

Primary Examiner — Peter M Poon
Assistant Examiner — Hae Rie Jessica Byun
(74) Attorney, Agent, or Firm — Hemisphere Law, PLLC; Zhigang Ma

(57) ABSTRACT

A pet feeding-training device is provided, which includes a feeding assembly. The feeding assembly includes a food plate and a housing. A panel of the housing is provided with a first channel opening opposite to the food plate. A hopper assembly for placing food is disposed in the housing. The hopper assembly includes a hopper and a gear, the gear includes a first rotating shaft, and the gear is connected to a side of the hopper through the first rotating shaft. A hopper opening is disposed in the housing, and the hopper is disposed in the hopper opening. The other side of the hopper is provided with a second rotating shaft. A top of the housing is provided with a button, a rack is disposed above the gear, the rack is engaged with the gear, and the button is connected to the rack.

16 Claims, 6 Drawing Sheets

(56) References Cited

U.S. PATENT DOCUMENTS

| | | | |
|---|---|---|---|
| 2010/0065577 A1* | 3/2010 | Coughlin | G07F 11/24 |
| | | | 221/277 |
| 2010/0181279 A1* | 7/2010 | Gruenwald | B65D 23/12 |
| | | | 206/219 |
| 2012/0024883 A1* | 2/2012 | Schmidt | A01K 1/0356 |
| | | | 221/3 |
| 2018/0295807 A1* | 10/2018 | Hsu | A01K 15/021 |
| 2022/0192148 A1* | 6/2022 | Wu | A01K 5/0275 |

\* cited by examiner

PET FEEDING-TRAINING DEVICE

TECHNICAL FIELD

The disclosure relates to the technical field of pet feeding, in particular to a pet feeding-training device.

BACKGROUND

At present, more and more families raise pets around the world, and well-trained pets are more and more popular. Feeding and training pets have been paid more and more attention. When people feed and train pets, people use voice, gesture, and food rewards to achieve a purpose of training.

At present, when people feed and train their pets, they usually feed them by hand. This way has the following problems: firstly, it is inconvenient; it usually requires two hands to cooperate, one hand instructs and trains the pet, the other hand gives food as a reward, at the same time, and a container for food is also needed around, which is not very convenient. Secondly, it is unsafe; there is a risk of being bitten or scratched by the pet's teeth when people feed the pet by hand. Thirdly, it is unsanitary; when a pet eats, saliva of the pet will pollute the hands of the trainer, which is easy to cause the trainer to be infected with diseases; at the same time, the food in the container will be contaminated by the food grabbed by the trainer's hands, which is very unsanitary and has a risk of infection.

SUMMARY

For detects in the prior art, a main purpose of the disclosure is to provide a pet feeding-training device with strong practicability, convenient feeding and training of pets, safer and more sanitary use.

In order to achieve the above purpose, the disclosure provides the pet feeding-training device which includes a feeding assembly, and the feeding assembly incudes a food plate and a housing; the food plate is connected to the housing; a panel of the housing is provided with a first channel opening opposite to the food plate; a hopper assembly for placing food is disposed in the housing.

The hopper assembly includes a hopper and a gear, the gear includes a first rotating shaft, the gear is connected to a side of the hopper through the first rotating shaft, a hopper opening is disposed in the housing, the hopper is disposed in the hopper opening, and a position of the hopper opening corresponds to a position of the first channel opening.

A top of the housing is provided with a button, a rack is disposed above the gear, the rack is engaged with the gear, and the button is connected to the rack.

The other side of the hopper is provided with a second rotating shaft, and the hopper is connected to a side of the hopper opening through the second rotating shaft.

An area of the hopper opening is larger than an area of the hopper, and a shape of the hopper opening corresponds to a shape of the hopper.

The button includes a fixing base, the fixing base is disposed above the hopper opening, the button further includes a button column, and the button is connected to the rack through the button column passing through the fixing base.

The button further includes a spring, and the spring is disposed in fixing base.

The rack includes a rack column.

A sounding piece is disposed below the hopper opening, and a protrusion is disposed on the sounding piece; and the protrusion corresponds to a position of the rack column.

The feeding assembly further includes a feeder for placing the food, an upper end of the feeder is provided with an upper cover; the upper cover includes a second channel opening, a position of the second channel opening corresponds to the position of the hopper opening, and the feeder is connected to the housing through the upper cover.

A size of the upper cover corresponds to a size and a shape of the housing.

A shape of the feeder includes cylinder, prism, or sphere.

The feeder is a bottle or ajar.

In the above technical solution, the disclosure has beneficial effects as follows. By setting a hopper assembly in a feeding assembly of a feeding-training device of the disclosure, the hopper assembly can be turned over by a control of a gear, and pet food in the hopper can enter a feeding plate through a first channel opening by turning over the hopper, and it is more convenient and sanitary to feed pets by the food plate. The disclosure is also provided with a sounding piece for training, which combines the feeding and training of the pets; and the disclosure realizes a single-hand operation, has stronger functionality, and meets the needs of consumers. The feeding assembly further includes a feeder for placing food which can store food. By tilting the feeder, the stored food is sent into the hopper through an upper cover, then the stored food is sent into the food plate by turning over the hopper. The operation is simple and practical. The disclosure is sanitary and safe in use and suitable for universal popularization.

BRIEF DESCRIPTION OF DRAWINGS

In order to more clearly explain the embodiments of the disclosure or the technical solutions in the prior art, the following will briefly introduce attached drawings that are needed to be used in the embodiments or the description of the prior art. Apparently, the attached drawings in the following description are only some embodiments of the disclosure. For those skilled in the art, without paying creative works, they can also obtain other attached drawings according to the structures shown in the attached drawings.

Figure 1:
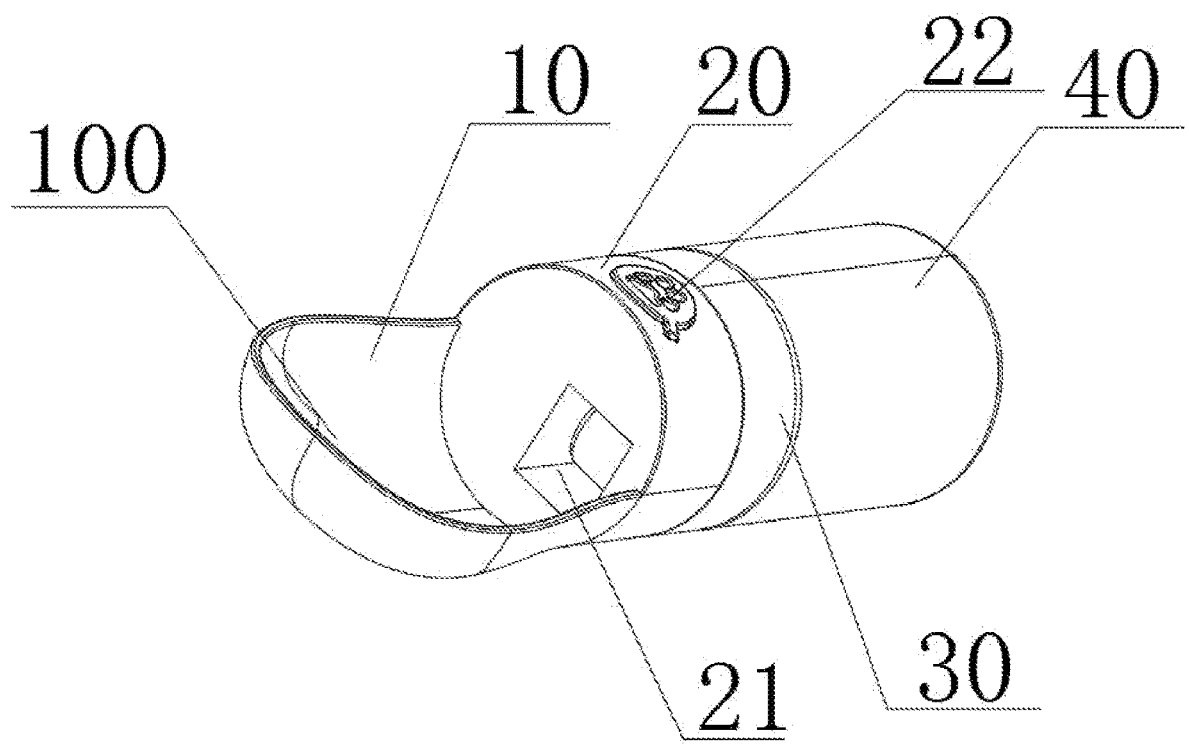
FIG. 1 is a schematic structural diagram of a pet feeding-training device in an embodiment of the disclosure.

The realization, functional features and advantages of the disclosure will be further described with combination of the attached drawings and the embodiments.

DETAILED DESCRIPTION OF EMBODIMENTS

The technical solutions in the embodiments of the disclosure will be described clearly and completely below in combination with the attached drawings in the embodiments of the disclosure. Apparently, the described embodiments are only part of the embodiments of the disclosure, not all of them. Based on the embodiments of the disclosure, all other embodiments obtained by those ordinary skilled in the art without creative works should belong to the scope of protection of the disclosure.

It should be noted that all directional indications (such as up, down, left, right, front, back, etc.) in the embodiments of the disclosure are only used to explain the relative position motion, etc. among components according to a specific attitude (as shown in the FIGS). If the specific attitude changes, the directional indication will change accordingly.

In the disclosure, unless otherwise specified and defined, the terms "connect", "fix", etc. should be understood in a broad sense. For example, "fix" can be a fixed connection, a detachable connection, or an integration; it can be a mechanical connection or an electrical connection; it can be a direct connection or an indirect connection through an intermediate medium; and it can be a connection between insides of two elements or the interaction between the two elements, unless otherwise specified. For those ordinary skilled in the art, the specific meaning of the above terms in the disclosure can be understood according to specific situations.

In addition, the description of "first", "second" and others in the disclosure is only for the purpose of description, and cannot be understood as indicating or implying its relative importance or implying the number of indicated technical features. Thus, the features defined as "first" and "second" can explicitly or implicitly include at least one such feature. In addition, the technical solutions of various embodiments can be combined with each other, but they must be based on the realization by those ordinary skilled in the art. When the combination of technical solutions is contradictory or impossible, it should be considered that the combination of such technical solutions does not exist, nor is it within the scope of protection claimed by the disclosure.

The disclosure provides a pet feeding-training device.

Referring to FIG. 1 to FIG. 6, in an embodiment of the disclosure, the pet feeding-training device includes a feeding assembly 100. The feeding assembly 100 includes a food plate 10 and a housing 20. The food plate 10 is connected to the housing 20. A panel of the housing 20 is provided with a first channel opening 21 opposite to the food plate 10. A hopper assembly for placing food is disposed in the housing 20.

The hopper assembly includes a hopper 25 and a gear 26, the gear 26 includes a first rotating shaft 261, the gear 26 is connected to a side of the hopper 25 through the first rotating shaft 261, a hopper opening 28 is disposed in the housing 20, the hopper 25 is disposed in the hopper opening 28, and a position of the hopper opening 28 corresponds to a position of the first channel opening 21. The other side of the hopper 25 is provided with a second rotating shaft 262, and the hopper 25 is connected to a side of the hopper opening 28 through the second rotating shaft 262.

A top of the housing 20 is provided with a button 22, a rack 24 is disposed above the gear 26, the rack 24 is engaged with the gear 26, and the button 22 is connected to the rack 24.

In the embodiment, preferably, an area of the hopper opening 28 is larger than an area of the hopper 25, and a shape of the hopper opening 28 corresponds to a shape of the hopper 25. Specifically, the area of the hopper opening 28 is slightly larger than the area of the hopper 25, and thus the hopper 25 can be turned over in the hopper opening 28.

In the embodiment, a shape of the hopper 25 can be a part of a cylinder, a part of a cone, a part of a sphere, a part of a frustum or a combination of these shapes. By turning over the hopper 25 around the first rotating shaft 261 and the second rotating shaft 262, quantitative feeding can be realized while the hopper opening 28 can keep a closed state or a state with a small opening. The quantity of the quantitative feeding each time is realized by a size of the hopper 25.

Figure 2:
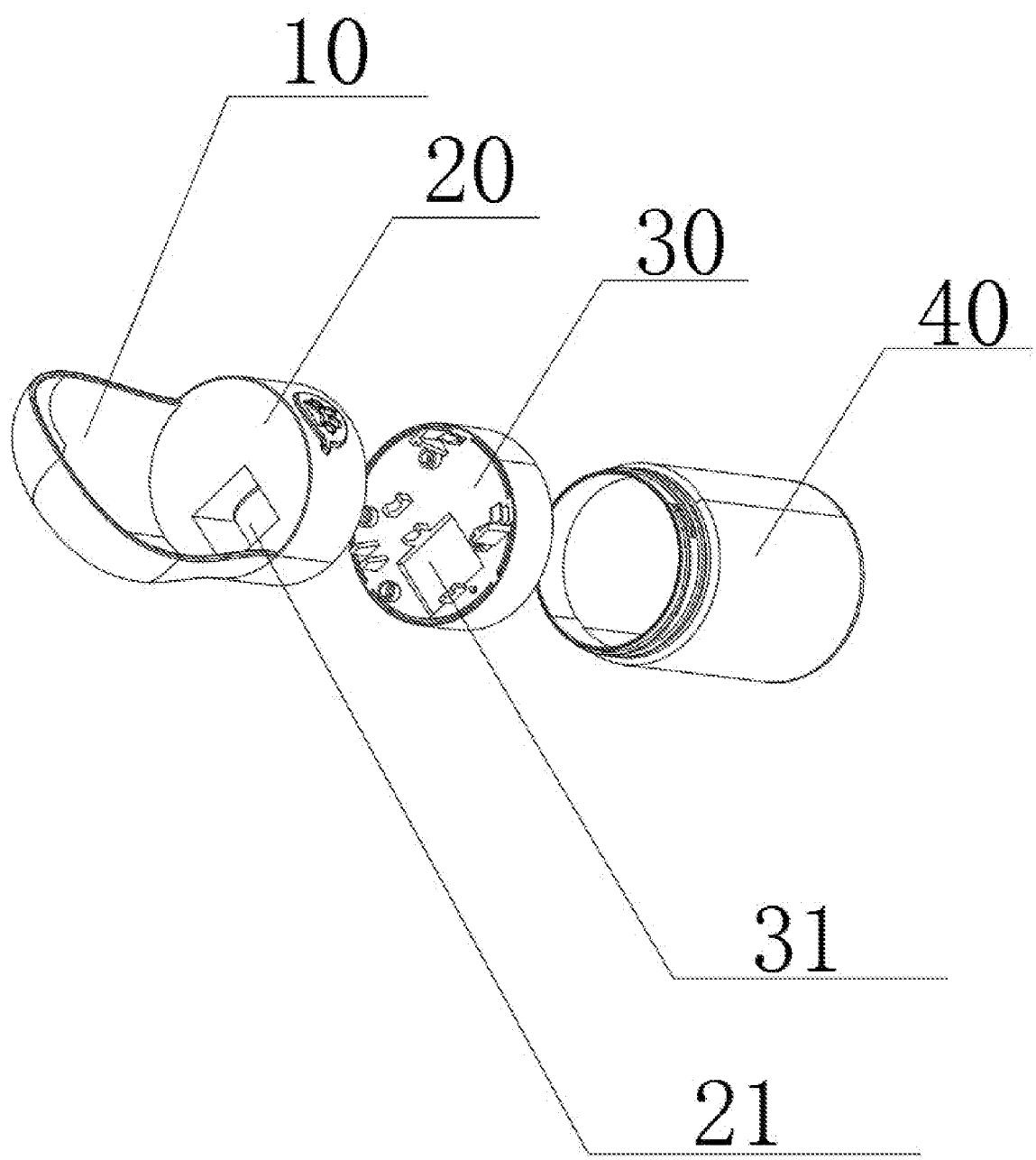
FIG. 2 is a disassembly diagram of the pet feeding-training device in the embodiment of the disclosure.
Figure 3:
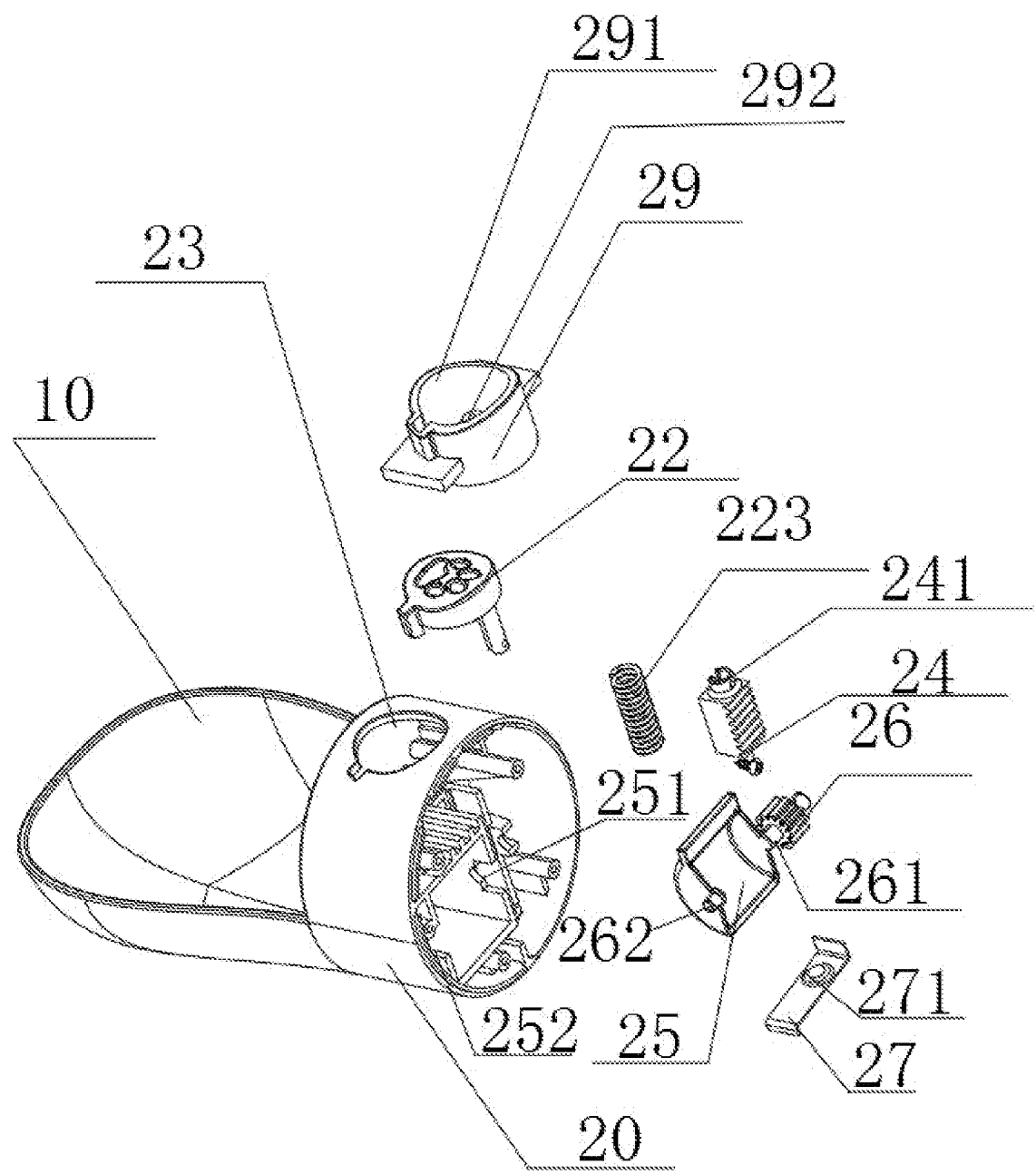
FIG. 3 is a first disassembly diagram of a feeding assembly of the pet feeding-training device in the embodiment of the disclosure.
Figure 4:
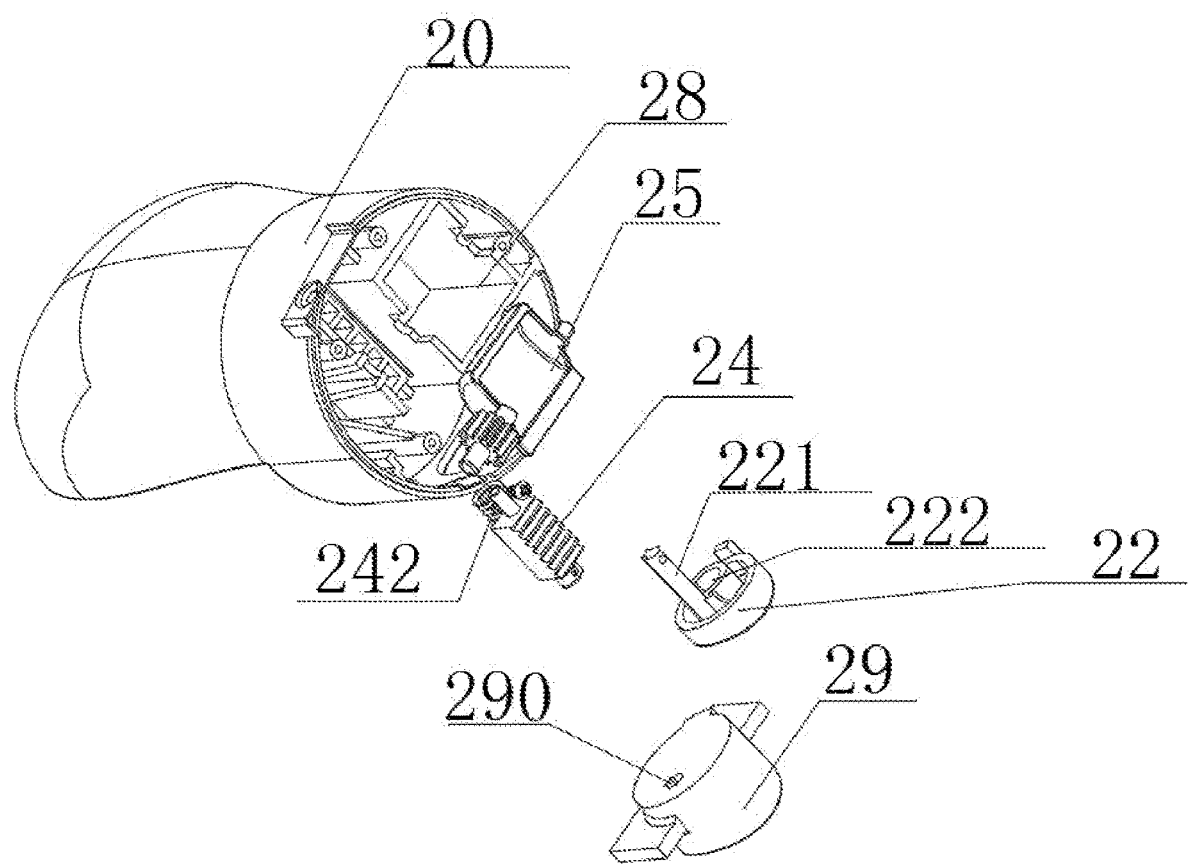
FIG. 4 is a second disassembly diagram of the feeding assembly of the pet feeding-training device in the embodiment of the disclosure.
Figure 5:
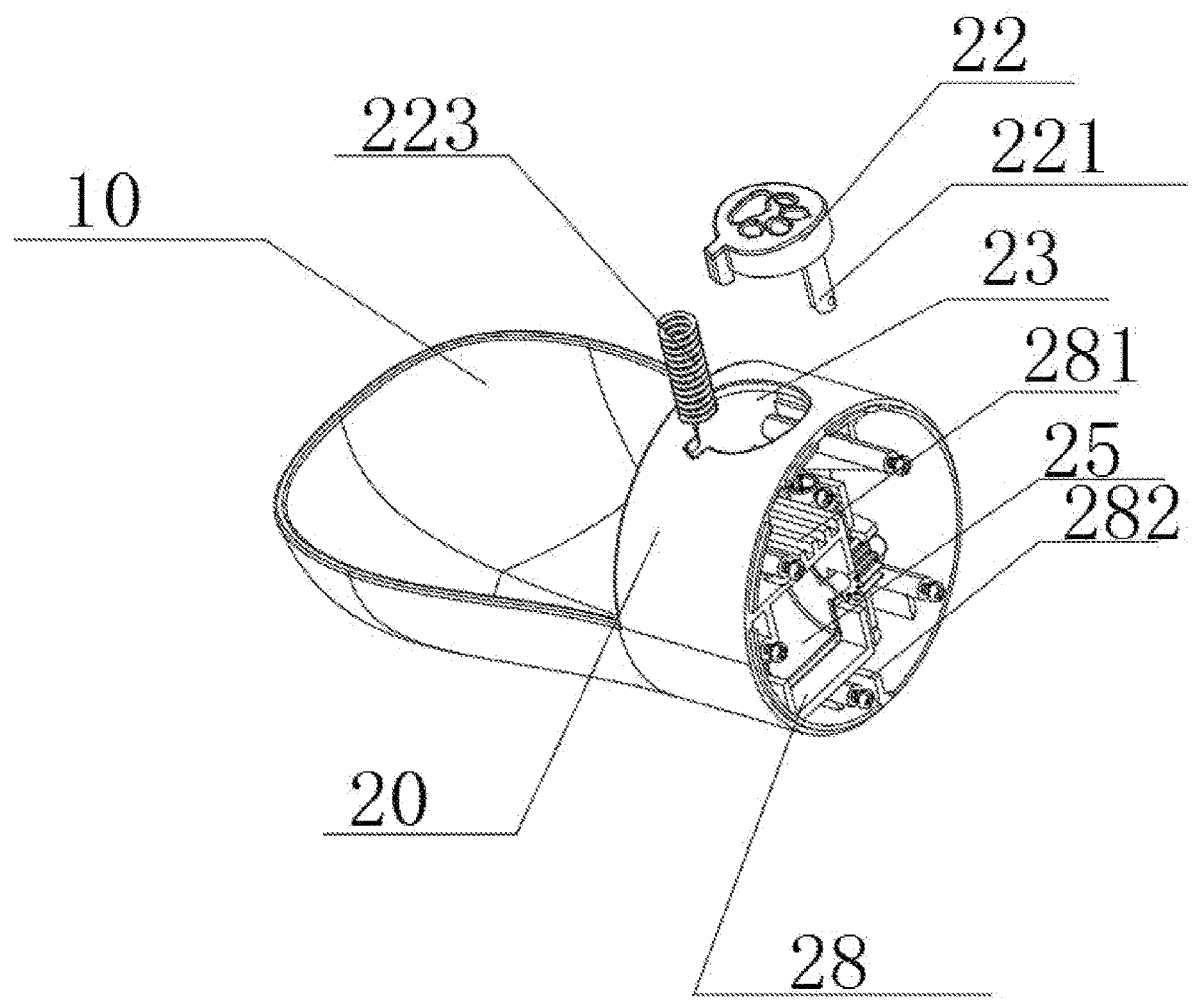
FIG. 5 is a third disassembly diagram of the feeding assembly of the pet feeding-training device in the embodiment of the disclosure.
Figure 6:
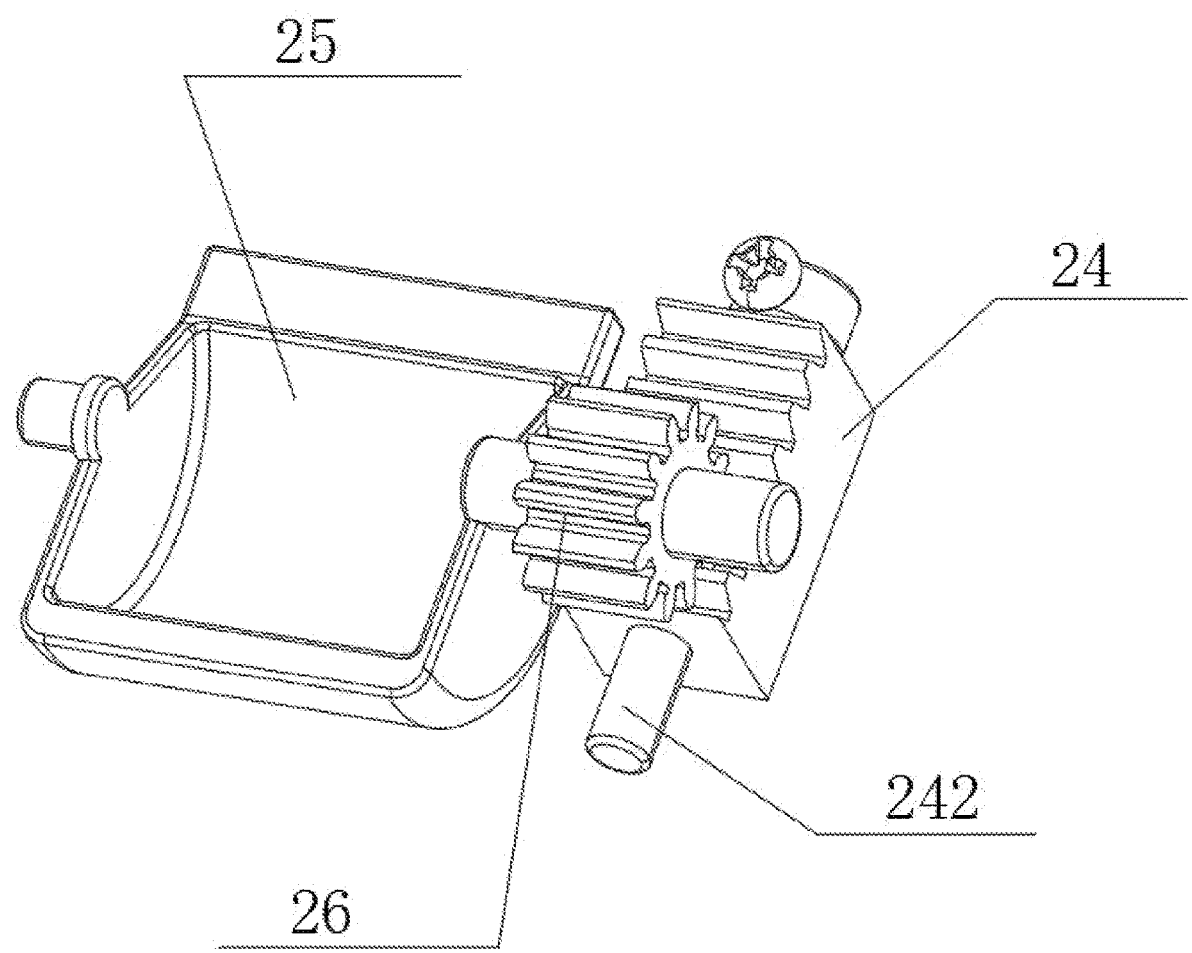
FIG. 6 is a schematic diagram of a structure of a hopper assembly of a pet feeding-training device in the embodiment of the disclosure.

In the embodiment, two sides of the food plate 10 are connected to two sides of the housing 20. Preferably, the food plate 10 and the housing 20 are integrated into a whole by injection molding. The top of the housing 20 is provided with a button hole 23, and the size and shape of the button hole 23 correspond to the size and shape of the button 22. The button 22 is disposed on the top of the housing 20 through the button hole 23. Referring to FIG. 2, FIG. 3, and FIG. 4, in the embodiment, preferably, the button 22 includes a button column 221, and a top of the rack 24 is provided with a gear hole 241. The button 22 is connected to the rack 24 through the button column 221 inserting the gear hole 241.

Referring to FIG. 2, FIG. 3, FIG. 4, FIG. 5, and FIG. 6, in the embodiment, the button 22 controls the gear 26 to rotate through the rack 24, and thus the hopper 25 is turned over in the hopper opening 28 by the rotating of the gear 26. When the pet feeding-training device is used, people place food in the hopper 25 and press the button 22 to turn over the hopper 25. After turning over the hopper 25, the food is sent to the food plate 10 through the first channel opening 21. When the hopper 25 is turned over, an outer wall of the hopper 25 makes the first channel opening 21 keep a closed state or a state with a small opening to prevent the excess food from leaking. It is more convenient and flexible to feed pets with the food in the food plate 10.

In the embodiment, preferably, two sides of the hopper opening 28 are respectively provided with a first groove 251 and a second groove 252, an end of the first rotating shaft 261 is arranged on the first groove 251, and an end of the second rotating shaft 262 is arranged on the second groove 252. The other end of the first rotating shaft 261 and the other end of the second rotating shaft 262 are respectively connected with two sides of the hopper 25. When the rack 24 controls the rotation of the gear 26, the hopper 25 is driven to be turned over.

In the embodiment, preferably, a rack slot is arranged on the outside of the hopper opening 28, a position of the rack slot corresponds to the button hole 23, and the rack 24 is arranged in the rack slot.

Referring to FIG. 3 and FIG. 4, in the embodiment, preferably, the button 22 includes a fixing base 29 which is arranged above the hopper opening 28, and the button 22 is connected to the rack 24 through the button column 221 passing through the fixing base 29.

In the embodiment, preferably, a bottom of the fixing base 29 is provided with a through hole 290, and the button column 221 is connected to the rack 24 through the through hole 290.

In the embodiment, preferably, a shape of the fixing base 29 is cylindrical, the fixing base 29 includes a circular cavity 291. A bottom of the button 22 is provide with the hollow cylindrical button column 221. The bottom of the button 22 is further provided with a first clamping slot 222, and the fixing base 29 is provided with a second clamping slot 292. A spring 223 is disposed on the bottom of the button 22. An end of the spring 223 is arranged in the first clamping slot 222, and the other end of the spring 223 is arranged in the second clamping slot 292. When the button 22 is pressed, the button 22 can be reset to its original position through the spring 223.

In the embodiment, preferably, a top of the hopper opening 28 is provided with a support frame 281. The fixing base 29 is disposed on the support frame 281, which makes the use of the fixing base 29 safer and more stable.

Furthermore, preferably, a bottom of the rack 24 is provided with a rack column 242. A sounding piece 27 is disposed below the hopper opening 28, and a protrusion 271 is disposed on the sounding piece 27. The protrusion 271 corresponds to a position of the rack column 242. Furthermore, preferably, a support block 282 is disposed below the hopper opening 28, and the sounding piece 27 is disposed on the support block 282.

In the embodiment, when the button 22 controls the rack 24, the rack 24 moves downward. The rack column 242 knocks the protrusion 271 to make a sound of the sounding piece 27. In this way, when the button 22 is pressed, the pet feeding-training device can not only feed the pets, but also train the pets by making the sound with the sounding piece 27. It makes the pets form a conditioned reflex, that is, the pets are reminded that when there is the sound, there will be food to feed.

In addition, in order to train the pets, when pets have made correct actions during training and a trainer need to reward the pets, the trainer presses the button 22 by a finger, which will drive the rack 24 to move downward, the movement of the rack 24 drives the gear 26 on hopper 25 to rotate, and the rotation of the gear 26 drives the hopper 25 to turn over. The hopper 25 is turned over and pours the food already loaded in the hopper 25 into the food plate 10 through the first channel opening 21. During the turning of the hopper 25, the first channel opening 21 will keep a closed state or a state with a small opening. After the hopper 25 is turned over in place, the first channel opening 21 will be closed to prevent excess food from leaking, at the same time, the rack column 242 knocks the sounding piece 27 to make the sound.

The trainer releases his finger, the button 22 moves back under an action of the spring 223, the rack 24 is driven to move back, and the rack 24 drives the gear 26 to reverse, and then the hopper 25 is reversed, thereby closing the first channel opening 21.

By the turning of the hopper 25, the disclosure realizes that the first channel opening 21 keeps the closed state or the state with a small opening when the trainer feeds the pets, and ensures that only the loaded food in the hopper 25 can be poured into the food plate 10 each time. The disclosure also realizes that the size of the hopper 25 determines the quantity of each the quantitative feeding, thereby achieving the purpose the quantitative feeding for the pets each time.

In the disclosure, a transmission structure of the gear 26 and the rack 24 can be replaced by another mechanical structure such as a crank slider structure, a shift fork structure, a scotch yoke structure, or a motor combined with a gearbox.

In the disclosure, a shape of the hopper 25 can be a part of a cylinder, a part of a cone, a part of a sphere, a part of a frustum or a combination of these shapes.

Referring to FIG. 1, FIG. 2, and FIG. 3, the feeding assembly 100 further includes a feeder 40 for placing the food, preferably, the feeder 40 can be a bottle or a jar. The feeder 40 is provided with an upper cover 30. The upper cover 30 includes a second channel opening 31, a position of the second channel opening 31 corresponds to the position of the hopper opening 28, and the feeder 40 is connected to the housing 20 through the upper cover 30.

In the embodiment, preferably, a size of the upper cover 30 corresponds to a size and a shape of the housing 20.

In the embodiment, preferably, a shape of the feeder 40 includes one of cylinder, prism, or sphere.

In the embodiment, preferably, the feeder 40 is a cylindrical bottle. The upper cover 30 is actually a bottle cap. The feeder 40 contains the food for feeding pets. A side of the upper cover 30 tightly covers the feeder 40, and the other side of the upper cover 30 is screwed together with the housing 20. The position of the second channel opening 31 corresponds to the position of the hopper opening 28. In this way, the feeder 40 is connected to the feeding assembly 100. When the feeder 40 is tilted, the food is poured into the hopper 25 through the second channel opening 31, the button 22 controls the hopper 25 to be turned over, and the food is sent to the food plate 10. The food plate 10 is set to make feeding and training the pets more sanitary. At the same time, feeding and training the pets is safer, more reliable, more convenient and flexible.

The above is only a preferred embodiment of the disclosure, which does not limit the scope of patent protection of the disclosure. Without departing from the spirit and scope of the disclosure, the disclosure will also have various changes and improvements. Any equivalent structural transformation made by using the description and the attached drawings of the disclosure under the disclosure concept, and direct or indirect applications in other related technical fields, should be included in the scope of patent protection of the disclosure.

What is claimed is:

1. A pet feeding-training device, comprising a feeding assembly, wherein the feeding assembly comprises a food plate and a housing; the food plate is connected to the housing; a panel of the housing is provided with a first channel opening opposite to the food plate; a hopper assembly for placing food is disposed in the housing;

wherein the hopper assembly comprises a hopper configured to place the food and a gear, the gear comprises a first rotating shaft, the first rotating shaft is directly connected to a side of the hopper, the gear is directly connected to the first rotating shaft, a hopper opening is disposed in the housing, the hopper is disposed in the hopper opening, and a position of the hopper opening corresponds to a position of the first channel opening;

wherein a top of the housing is provided with a button, a rack is disposed above the gear, the rack is engaged with the gear, and the button is directly connected to the rack;

wherein the button is configured to be pressed to directly drive the rack to move downward, thereby to drive the gear to rotate to drive the hopper to turn over and pour the food into the food plate through the first channel opening;

wherein the button comprises a fixing base, the fixing base is disposed above the hopper opening, the button further comprises a button column, and the button is connected to the rack through the button column passing through the fixing base; and wherein the fixing base is disposed inside the housing, and defines a circular cavity, and the button is disposed in the circular cavity of the fixing base and exposed from the fixing base and the top of the housing; and a bottom of the fixing base defines a through hole, a top of the rack defines a gear hole, and the button column passes through the through hole of the fixing base and inserts into the gear hole of the rack.

2. The pet feeding-training device according to claim 1, wherein the other side of the hopper is provided with a second rotating shaft, and the hopper is connected to a side of the hopper opening through the second rotating shaft.

3. The pet feeding-training device according to claim 2, wherein the housing further defines a first groove and a second groove on two sides of the hopper opening, the first rotating shaft is disposed in the first groove, and the second rotating shaft is disposed in the second groove.

4. The pet feeding-training device according to claim 1, wherein an area of the hopper opening is larger than an area of the hopper, and a shape of the hopper opening corresponds to a shape of the hopper.

5. The pet feeding-training device according to claim 1, wherein the button further comprises a spring, and the spring is disposed in the fixing base.

6. The pet feeding-training device according to claim 1, wherein the rack comprises a rack column.

7. The pet feeding-training device according to claim 6, wherein a sounding piece is disposed below the hopper opening, and a protrusion is disposed on the sounding piece; and the protrusion corresponds to a position of the rack column.

8. The pet feeding-training device according to claim 7, wherein the button is further configured to drive the rack to move downward to drive the rack column of the rack to move downward to be in contact with the protrusion of the sounding piece to make a sound.

9. The pet feeding-training device according to claim 1, wherein the feeding assembly further comprises a feeder for placing the food, and an upper end of the feeder is provided with an upper cover; the upper cover comprises a second channel opening, a position of the second channel opening corresponds to the position of the hopper opening, and the feeder is connected to the housing through the upper cover.

10. The pet feeding-training device according to claim 9, wherein a size of the upper cover corresponds to a size and a shape of the housing.

11. The pet feeding-training device according to claim 10, wherein a shape of the feeder comprises one of cylinder, prism, and sphere.

12. The pet feeding-training device according to claim 9, wherein the feeder is connected to a side of the housing facing away from to the food plate, and the food plate protrudes from the housing towards a direction facing away from the feeder.

13. The pet feeding-training device according to claim 1, wherein a shape of the hopper is selected from the group consisting of a part of a cylinder, a part of a cone, a part of a sphere, and a part of a frustum.

14. The pet feeding-training device according to claim 1, wherein a support frame is disposed inside the housing and at a top of the hopper opening, the support frame is fixedly connected to the housing, and the fixing base is disposed on the support frame.

15. A pet feeding-training device, comprising:
  a food plate;
  a housing, connected to the food plate, defining a first channel opening facing towards the food plate, defining a hopper opening in communication with the first channel opening, and defining a first groove and a second groove located at two sides of the hopper opening;
  a hopper, disposed in the hopper opening; wherein a side of the hopper is provided with a first rotating shaft, and the other side of the hopper is provided with a second rotating shaft; the first rotating shaft is disposed in the first groove of the hopper opening, and the second rotating shaft is disposed in the second groove; and the hopper is configured to place food;
  a gear, connected to the hopper through the first rotating shaft;
  a rack, engaged with the gear; and
  a button, disposed on a top of the housing and directly connected to the rack; wherein the button is configured to drive the rack to move downward to drive the gear to rotate, to thereby drive the hopper to turn over and pour the food into the food plate through the first channel opening; and
  wherein a bottom of the rack is provided with a rack column; a support block is disposed in the housing and below the hopper opening, and a sounding piece is disposed on the support block; the sounding piece is provided with a protrusion thereon, and the button is further configured to drive the rack to move downward to drive the rack column of the rack to move downward to be in contact with the protrusion of the sounding piece to make a sound.

16. The pet feeding-training device according to claim 15, further comprising:
  a feeder for placing the food, disposed on a side of the housing facing away from the food plate; and
  an upper cover, disposed between the feeder and the housing; wherein the upper cover defines a second channel opening corresponding to the hopper opening, and the feeder is configured to pour the food into the hopper through the second channel opening of the upper cover when the feeder is tilted.

* * * * *